Aug. 18, 1936.       J. S. BEEKLEY       2,051,363
PROCESS FOR THE PREPARATION OF HYDROGEN
Filed Oct. 20, 1930
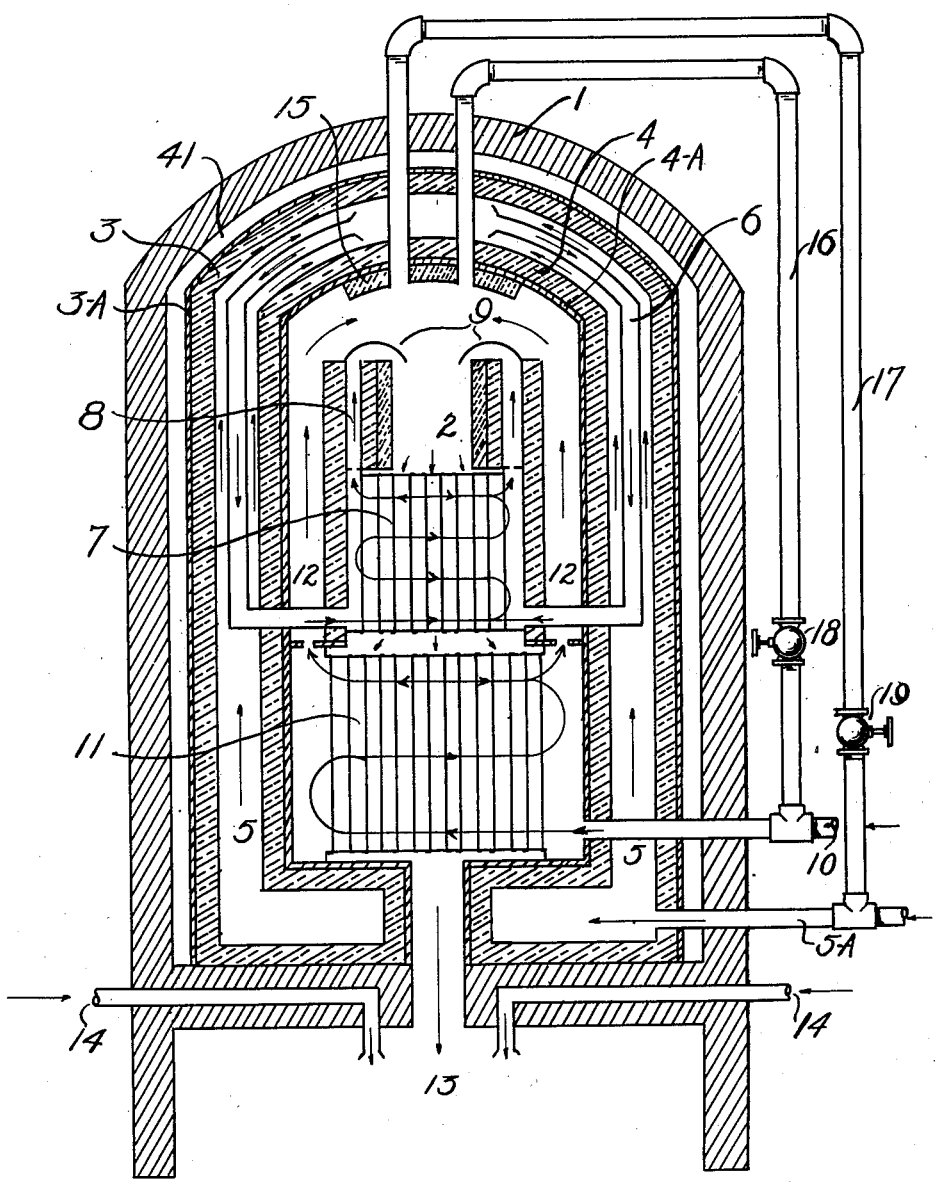
INVENTOR
JOHN S. BEEKLEY
BY
ATTORNEY Patented Aug. 18, 1936

2,051,363

UNITED STATES PATENT OFFICE 2,051,363

PROCESS FOR THE PREPARATION OF HYDROGEN

John S. Beekley, Charleston, W. Va., assignor, by mesne assignments, to E. I. du Pont de Nemours & Company, Wilmington, Del., a corporation of Delaware Application October 20, 1930, Serial No. 489,859

2 Claims. (Cl. 23—212)

This invention relates to a process for the preparation of hydrogen and particularly to a process in which a hydrocarbon-containing gas is subjected to thermal decomposition with oxygen at an elevated temperature.

The increase in the demand of hydrogen for use in the chemical and allied industries, has developed to such an extent in recent years that numerous methods have been exploited to supply this demand. As hydrocarbon-containing gases, such as natural gas, coke oven gas, and the like, are readily available, catalytic, combustion and other processes have been proposed for converting these gases into hydrogen. Owing to the difficulties encountered, however, in breaking down the hydrocarbons to obtain their hydrogen content, investigators have endeavored, due to the disadvantages and more or less uneconomical operation of the known processes, to obtain less expensive methods for hydrogen preparation. In the partial combustion process for the conversion of a hydrocarbon into hydrogen and oxides of carbon, the following chemical equation illustrates the reaction which takes place when methane is the reacting hydrocarbon:

$$2CH_4 + O_2 = 2CO + 4H_2$$

As this reaction is suitably exothermic, the addition of the hydrocarbon and the oxygen to the combustion at proper temperatures is sufficient to sustain the reaction. The reaction is generally conducted by the addition of approximately one-half a mol. of oxygen per mol. of methane. A larger proportion of oxygen will, of course, decrease the yield of hydrogen due to some of the hydrogen being burned to water.

It is understood, of course, that in all cases some water and some carbon dioxide are formed. Although it is possible to reduce the formation of these products to an almost negligible minimum by proper control of the quantity of oxygen supplied and the operating temperature, it is desirable in some instances to use excess oxygen, thereby increasing their formation above this minimum, in order to prevent deposition of carbon in the combustion chamber or in parts of the apparatus subsequently encountered by the reaction products.

The gas mixture produced, consisting essentially of carbon monoxide and hydrogen if pure oxygen is used, and of carbon monoxide, hydrogen, and nitrogen if air or oxygen-enriched air is used, may be subjected to the well-known reaction with steam over a catalyst mass, wherein nearly all of the carbon monoxide reacts with the steam to yield hydrogen and carbon dioxide. After removal of carbon dioxide and carbon monoxide by any of the conventional methods, the product consists of pure hydrogen, suitable for any desired purpose, or of pure hydrogen-nitrogen mixture, suitable for ammonia synthesis. It should be noted that the partial combustion process may be followed by the steam-conversion process without dropping the temperature of the gases being handled to atmospheric temperature.

If the ultimate use of the gas mixture produced by partial combustion is to be in the synthesis of oxygenated organic compounds, such as, for example, aliphatic alcohols, it may be desirable to control the ratio of carbon monoxide to hydrogen. This may be readily done by controlling the oxygen in-put and the operating temperature, and, if necessary, by adding some steam with the reactants before combustion.

It is the object of the present invention to improve the operating conditions under which the reaction may be effected. Another object of the invention is to provide a process for the preparation of mixtures consisting principally of carbon monoxide and hydrogen or carbon monoxide, hydrogen, and nitrogen, wherein the temperature of partial combustion of hydrocarbons is accurately controlled. A further object of this invention is to provide such a process in which partial combustion of gases containing methane, or homologues thereof, may be effected under high pressure. A still further object of the invention is to provide a suitable apparatus for conducting such processes.

Other objects and advantages will be more fully understood by reference to the following specification and to the accompanying drawing in which—

The figure is a diagrammatical illustration of a preferred form of combustion apparatus in which the reaction may take place.

In effecting the partial combustion of a hydrocarbon with oxygen or an oxygen-containing gas or air I have found that the operation can be greatly improved and more economically conducted by effecting the operation under elevated pressures. Generally I prefer to compress each gas separately, and after preheating each to the desired temperature, inject them simultaneously into the reaction chamber.

There are numerous advantages which are realized by carrying out the combustion reaction in this manner. Important economies of compression result, particularly when the hydrogen produced is for utilization in high-pressure synthesis, or when it is desired to carry out a subsequent treatment with steam or a purification process, such as removal of carbon dioxide, at elevated pressures, since the volume of the reactants is very considerably less than the volume of the products of the partial combustion, before or after any supplementary treatment. Thus, when methane and pure oxygen are used, the volume of reactants is only slightly more than one-half the volume of the products of combustion obtained, and very little more than one-third the volume of the gas mixture produced by treating these same products of combustion with steam. Also, conducting the partial combustion process under pressure permits subjection of the products to reaction with steam under pressure without cooling them to atmospheric temperature. Furthermore, due to the high pressures used the apparatus required for effecting the combustion as well as the preheaters employed are much more efficient and can be more economically constructed.

Referring now to the drawing which illustrates a preferred form of apparatus for carrying out this thermal decomposition of hydrocarbons, the cylindrical casing 1, which is constructed to withstand high pressures, is separated from the combustion chamber 2, by a steel shell 3—A covered with a suitable layer of insulation 3, which surrounds the combustion chamber. Between the cylindrical casing 1, and the insulated steel shell 3—A, there extends a space 41 for the circulation of cooling water by which the temperature of the casing 1 of the apparatus may be maintained at a comparatively cool temperature. Between the outer insulated shell 3—A and the inner steel shell 4—A to which is applied the layer of insulation 4, there lies an annular space 5, in which part of the cool incoming gases likewise aid in maintaining a low temperature of the casing 1. The requisite amount of air for combustion enters the apparatus and the annular space 5 through the pipe 5—A, from this annular space 5 the air passes into the conduit 6, and from conduit 6 it passes into a heat interchanger or air preheater 7. The air flows from the air preheater 7 into the annular space 8, about the combustion chamber 2 from which it receives further preheating and thence through the nozzles 9, into the combustion chamber 2, which may contain refractory material having more or less catalytic activity for the combustion reaction.

The other reactant—the hydrocarbon-containing gas—enters the combustion apparatus through pipe 10, into heat interchange relation with the gases flowing through the tubes of the heat interchanger or gas preheater 11. The gas preheater 11, and the air preheater 7, may be any suitable type of heat interchanger,—those of the tubular form shown in which the heated gases flow through the tubes and the gases being preheated flow in contact with the outer walls of the tubes, have proven satisfactory. From the gas preheater 11 the gases flow through the passage 12, which encircles the air preheater and combustion chamber and from this passage they go into contact with the gases from the annular space 8 in the combustion chamber 2. The gases after combustion pass then through the air preheater 7 and the gas preheater 11, out of direct contact with the incoming gases, of course, except by heat interchange through the walls of these preheaters. From the gas preheater 11 these partially cooled gases are then further cooled if desired in the cooling chamber 13, by means of water entering said chamber through pipes 14.

Owing to the high degree of heat, which may yield a temperature in the neighborhood of 1100–1500° C., evolved in combustion chamber 2, it is of advantage to line this chamber with the refractory material 15 to protect the steel shell 4—A from too rapid oxidization.

Under some conditions of operation it is advantageous to heat the hydrocarbon-containing gas in the preheater 7. This should be effected by so regulating the heat exchange surface and/or the velocity of the gas that there results substantially no deposition of carbon. I have found, however, that it is generally more advantageous to preheat the air by heat exchange with the gases just as they issue from the combustion chamber. By so doing the air may be heated almost to the temperature of combustion while the gases from the combustion, after preheating the air, have sufficient heat remaining to preheat the hydrocarbon-containing gases.

In order to control more accurately the temperature of the combustion, a part of the gas and/or air may be by-passed through the pipes 16 and 17 controlled by valves 18 and 19. The gas or air passing through these pipes has no degree of preheat and, therefore, enters the combustion chamber 2 at a low temperature, thereby enabling the operator to accurately control the temperature of combustion.

The operation of the above apparatus may be carried out in the following manner. Oxygen, air or a suitable oxygen-containing gas, after compression by suitable compressors not shown, enters the partial combustion apparatus through pipe 5—A, into the annular passageway 5. It here aids in maintaining the low temperature of the walls of the apparatus by insulating the combustion chamber 2 from the outer walls of the apparatus. The air then passes into the air preheater 7 in which its heat content is increased. The air from this preheater passes through the annular passage 8, being further heated to but a few degrees under the temperature of combustion, and then it is directed into the combustion chamber. The hydrocarbon-containing gas after compression by means not shown passes into the combustion apparatus through pipe 10, is heated to an intermediate temperature in the gas preheater 11, and finally through heat interchange in chamber 12, is raised to a temperature not in excess of that at which it deposits carbon, i. e. not generally higher than 500° C., at which temperature it enters the combustion chamber 2, which is maintained at a temperature in the neighborhood of 1200° C. The gases after combustion pass through the air preheater 7 giving up a large proportion of their heat to the incoming air, then through the gas preheater 11 in which they give up a further quantity of heat to the incoming hydrocarbon-containing gas and finally into the cooler 13.

The gases produced by this partial combustion apparatus consist primarily, if natural gas be decomposed, of carbon monoxide and hydrogen. The carbon monoxide can be readily converted into carbon dioxide and hydrogen by contacting this gas in the presence of an excess of steam with any of the well known water-gas catalysts, such as iron oxide, at a temperature in the neighborhood of approximately 500° C. While for some purposes this conversion is not required if the hydrogen is to be utilized in the presence of carbon monoxide, it is desirable, if a high hydrogen low carbon monoxide content is sought. Furthermore, if air rather than oxygen be used in the combustion process, the hydrogen produced will contain an appreciable percentage of nitrogen and by the addition of stoichiometrical portions of nitrogen or hydrogen, the gas may be used directly in the production of synthetic ammonia.

In order to obtain the full advantages of controlling the temperature of this reaction, I have found that pressures in the neighborhood of from 10 to 50 atmospheres should be employed as the hydrogen-containing gaseous products which are obtained by my process may be utilized in the synthesis of ammonia and other processes. I prefer generally, however, to conduct the combustion reaction at a pressure of approximately 25 atmospheres, at which pressure many of these processes are carried out.

Due to the high temperature of combustion, the heat interchange apparatus is subjected to rapid deterioration. I have found it, therefore, advisable to so control the temperature of the combustion by regulating the degree of preheat of the air and hydrocarbon and/or the amount of unpreheated gases, and especially the amount of air injected into the combustion chamber that the optimum minimum temperature be maintained in the combustion chamber. By preheating the air to a temperature of approximately 900° C. and the hydrocarbons to 500° C. the reaction in a well insulated chamber will be held in the neighborhood of 1500° C., by lowering the temperature of the preheated gases and/or injecting unpreheated gases into the combustion chamber this temperature can be lowered at will. By this procedure the reaction temperature is accurately controlled. The control of the reaction temperature in conjunction with the quantity of gases entering into the reaction likewise regulates the extent of the reaction and the products obtainable.

When preparing hydrogen by this process from natural gas the quantity of oxygen used must be accurately controlled for best results. Should too small an amount of oxygen be present, the hydrocarbons will often deposit much carbon with an ultimate clogging of the apparatus, thus necessitating costly shut-downs, while, on the other hand, if too large a quantity of air be employed, the hydrogen will burn and a high percentage of nitrogen will appear in the produced gas, too high for direct use in the synthesis of ammonia.

Various changes may be made in the above process and apparatus for the preparation of hydrogen, for example, in the pressure and temperature of the gas prior to and during the thermal decomposition and the method of controlling the temperature thereof, as well as in the structure of the partial combustion apparatus, without departing from this invention or sacrificing any of the advantages that may be derived therefrom.

I claim:

1. The process for the preparation of a hydrogen-containing gas from a hydrocarbon-containing gas which comprises subjecting the hydrocarbon-containing gas under elevated pressure to at least partial combustion in the presence of an oxygen-containing gas, the gases prior to combustion insulating the combustion reaction, the oxygen-containing gas in proximity to, and substantially surrounding the combustion reaction, and the hydrocarbon-containing gas substantially surrounding both the combustion reaction and the oxygen-containing gas.

2. The process for the preparation of a hydrogen-containing gas from a methane-containing gas which comprises subjecting the methane-containing gas under elevated pressure to at least partial combustion in the presence of an oxygen-containing gas, the gases prior to combustion insulating the combustion reaction, the oxygen-containing gas in proximity to, and substantially surrounding the combustion reaction, and the methane-containing gas substantially surrounding both the combustion reaction and the oxygen-containing gas.

JOHN S. BEEKLEY.